(12) United States Patent  
Panangipalli et al.

(10) Patent No.: US 9,141,340 B2  
(45) Date of Patent: Sep. 22, 2015

(54) INTEGRATION MESSAGE RESUBMISSION TOOL

(71) Applicant: ORACLE INTERNATIONAL CORPORATION, Redwoodshores, CA (US)

(72) Inventors: Veerabhadra Rao Panangipalli, Hyderabad (IN); Narayana Padmanabhuni, Bhimavaram (IN); Sivaram Challa, Andhra Pradesh (IN); Axel Allgeier, Parker, CO (US); Purushotham Kola, Secunderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 13/906,730

(22) Filed: May 31, 2013

(65) Prior Publication Data

US 2014/0359019 A1 Dec. 4, 2014

(51) Int. Cl.  
*H04L 1/18* (2006.01)  
*G06F 9/44* (2006.01)

(52) U.S. Cl.  
CPC .. *G06F 8/00* (2013.01); *G06F 8/36* (2013.01); *H04L 1/18* (2013.01)

(58) Field of Classification Search  
CPC ............................. H04L 67/10; G06F 11/1471  
See application file for complete search history.

(56) References Cited

U.S. PATENT DOCUMENTS

| | | | |
|---|---|---|---|
| 6,349,238 B1 * | 2/2002 | Gabbita et al. | 700/101 |
| 7,680,958 B2 * | 3/2010 | Noonan et al. | 709/246 |
| 7,818,750 B2 * | 10/2010 | Dunki et al. | 718/106 |
| 7,840,532 B2 * | 11/2010 | Wiser et al. | 707/610 |
| 8,352,538 B2 * | 1/2013 | Noonan et al. | 709/201 |
| 8,880,668 B2 * | 11/2014 | Ebrahimi et al. | 709/223 |
| 2013/0283106 A1 * | 10/2013 | King et al. | 714/49 |

* cited by examiner

*Primary Examiner* — Esaw Abraham  
(74) *Attorney, Agent, or Firm* — Miles & Stockbridge P.C.

(57) ABSTRACT

A system for resubmitting a message for integration of applications receives information relating to a plurality of messages. Each message of the plurality of messages has been unsuccessfully transmitted between integration milestones, the message for resubmission being one of the plurality of messages. The corresponding integration milestones of the plurality of messages comprise different types of integration milestones. The system receives criteria to filter the received information. The system determines the message for resubmission by filtering the received information in accordance with the received criteria. The system sends the message from a first integration milestone to a second integration milestone.

20 Claims, 13 Drawing Sheets

Fig. 10

INTEGRATION MESSAGE RESUBMISSION TOOL

FIELD

One embodiment is directed generally to a computer system, and in particular to a computer system that resubmits messages transmitted for integration of applications.

BACKGROUND INFORMATION

In computing, "integration" can generally mean bringing together a collection of different computing systems/software applications so that they function as a coordinated whole. An application integration architecture ("AIA") provides a framework that allows one to bring the applications together by creating business-process flows. A business process-flow may generally be considered to be a collection of related and structured computing activities (performed by the integrated systems/applications) that produces a specific business service for a user.

In order for the collection of different systems/applications to perform the computing activities of a built business-process flow, the applications typically communicate with each other via specialized messages. These messages may coordinate the operation of each application and coordinate the transfer of data between each of the applications. A message may be transmitted from a source application to a target application. If the message is not successfully transmitted, the message may be re-sent/resubmitted at a later time.

SUMMARY

One embodiment is a system for resubmitting a message for integration of applications. The system receives information relating to a plurality of messages. Each message of the plurality of messages has been unsuccessfully transmitted between integration milestones, the message for resubmission being one of the plurality of messages. The corresponding integration milestones of the plurality of messages comprise different types of integration milestones. The system receives criteria to filter the received information. The system determines the message for resubmission by filtering the received information in accordance with the received criteria. The system sends the message from a first integration milestone to a second integration milestone.

BRIEF DESCRIPTION OF THE DRAWINGS

FIG. 10 is a screen shot of an interface that shows a flow trace of a selected message in accordance with one embodiment.

DETAILED DESCRIPTION

Figure 1:
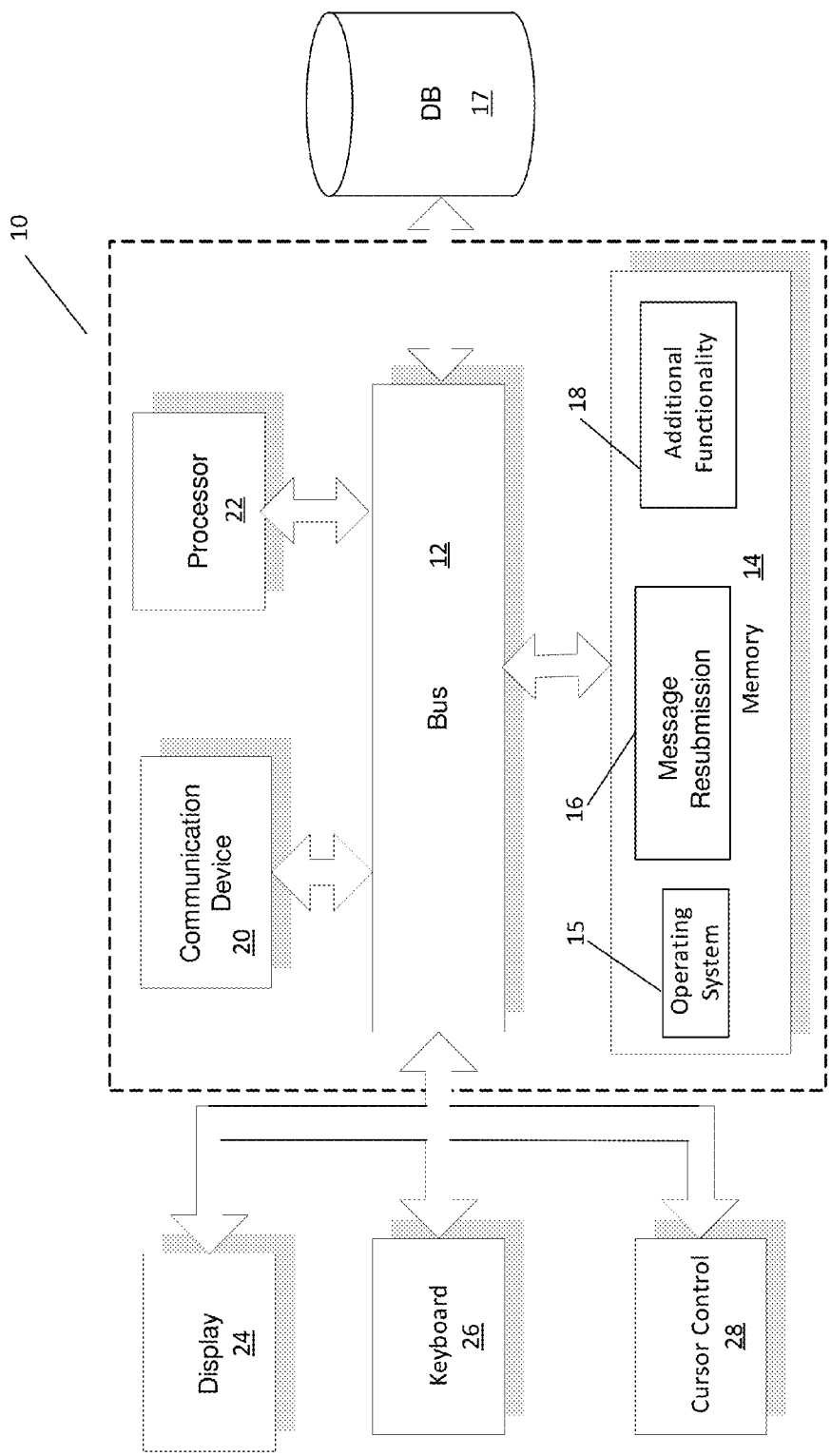
FIG. 1 is an overview block diagram of a computer system for resubmitting messages in accordance with an embodiment of the present invention.

In transmitting a message for integration of applications, the message may be transmitted between integration milestones associated with each of the applications. If the message is unsuccessfully transmitted between the integration milestones, the message may be rolled back to a configured error destination associated with a source milestone (the milestone from which the message originated), and the message may need to be resubmitted once the transmission problem is corrected (once the reasons for failure are fixed). In some circumstances, the reasons for failure can be attributable to system failures or business faults.

One embodiment is a tool that allows a user to resubmit data/messages transmitted between integration milestones. An integration milestone may be generally understood as a message checkpoint where a transmitted message is preserved. A message checkpoint is associated with an application, but does not necessarily correspond to the application itself. The tool receives information relating to a plurality of messages that have been unsuccessfully transmitted between integration milestones. The tool allows a user to filter the received information according to specific criteria in order to determine at least one message to resubmit. The tool then resubmits the selected/filtered message, and the integration flow re-initiates.

Examples of integration milestones include, but are not limited to, queues, topics, resequencers, and advanced queues ("AQs"). In one embodiment, the resequencers may be Oracle Resequencers, and the AQs can be Oracle AQs. When using integration milestones to transmit messages, the resubmission of failed messages may differ based on the type of integration milestone chosen. Transmitting a message using queues as a milestone typically includes a one-to-one transmission between one queue and a receiver. Transmitting messages using topics as a milestone may include a one-to-many transmission between one topic and a plurality of receivers. Transmitting messages using resequencers, such as an Oracle Resequencer, as a milestone will persist the messages and can perform the function of re-ordering the messages. Transmitting messages using advanced queues, such as an Oracle AQ, may allow the messages to be stored persistently in AQ tables, such as Oracle AQ tables. Therefore, based on the type of integration milestone chosen, the logic to resubmit the failed messages may differ.

While transmitting a message from a source integration milestone to a target integration milestone, if an error/fault occurs in the transmission of the message, the message can be rolled back (i.e., returned) to the configured error destination of the source integration milestone. The source integration milestone is the milestone that initiates the specific message, and the target integration milestone is the milestone where the transaction boundary ends. A message that fails to be transmitted due to an error/fault may be referred to as a failed message. Embodiments may then resubmit the failed message (i.e., retry the transmission).

Known approaches for resubmitting messages between integration milestones are generally limited to resubmitting messages of either queues or topics. Known approaches for resubmitting messages between integration milestones generally do not address resubmitting messages of resequencers or of advanced queues. Additionally, known approaches generally do not provide an overall, consolidated view of all the messages to be re-sent between different types of integration milestones. In other words, known approaches, in general, do not provide a one-stop solution to address a variety of different types of integration milestones (e.g., queues, topics, resequencers, and advanced queues). Also, according to the known approaches, there is generally no robust search criteria that can be used to filter out the messages of interest (to be resubmitted).

In contrast to the known approaches, one embodiment of the present invention uses search criteria that can be used regardless of the type of underlying integration milestone. Also, one embodiment of the present invention helps a user to search through messages based on business context identifiers (e.g., order ID/account ID) rather than technical identifiers like Execution Context IDs ("ECID") (internal identifiers which may not have much value from a business context perspective). In one embodiment, milestone details relating to messages can be fetched automatically from persistent storage and the user is not prompted for those values. When a user chooses failed messages for resubmission, one embodiment automatically knows where to fetch the data relating to the failed messages from. In one embodiment, the data can be fetched automatically from a configuration error bucket of a source milestone. In one embodiment, the resubmitted messages also include "state" information that allow for easy identification of what phase the messages are in and to help the user to track the messages better. In one embodiment, if a message that has failed to be sent fails again after re-submission because of some issue in the system, such history items relating to the sending of the message are attached to a current active failed record. Therefore, the history of the failed messages can be seen and correlated.

In contrast to the known approaches, embodiments of the present invention provide an overall, consolidated view of all messages to be re-sent between different types of integration milestones, regardless of the types of milestones (e.g., queues, topics, resequencers, and AQs). Embodiments also allow a user to apply filters to all of the messages that are to be re-sent so that the user may find a specific message to be re-sent. The user may then resubmit the specific message upon finding it. The known approaches generally do not have any context information associated with sent messages, and thus, a user generally cannot search through the messages based on business context related information nor search through the messages based on AIA header-related information. Also, the known approaches generally do not address different milestones seamlessly. The known approaches may use a configuration for queues that is different than a configuration for topics, for example. The known approaches generally would look directly within the milestones for error messages, and would not perform the steps of filtering the messages based on a criteria and then performing the resubmission of the filtered messages. The known approaches also do not operate in conjunction with Oracle AQs nor Oracle Resequencers.

FIG. 1 is an overview block diagram of a computer system 10 for resubmitting messages in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules include an operating system 15 that provides operating system functionality for system 10. The modules further include a message resubmission module 16 for a message resubmission system that resubmits messages transmitted between integration milestones, as disclosed in more detail below. System 10 can be part of a larger system, such as a system that operates in conjunction with Oracle Fusion Middleware™ and/or business process-management products by Oracle Corp., for example. Therefore, system 10 will typically include one or more additional functional modules 18 to include additional functionality, such as data processing functionality for filtering messages to be resubmitted, for example. A database 17 is coupled to bus 12 to store data used with modules 16 and 18, such as messages to be resubmitted.

Figure 2:
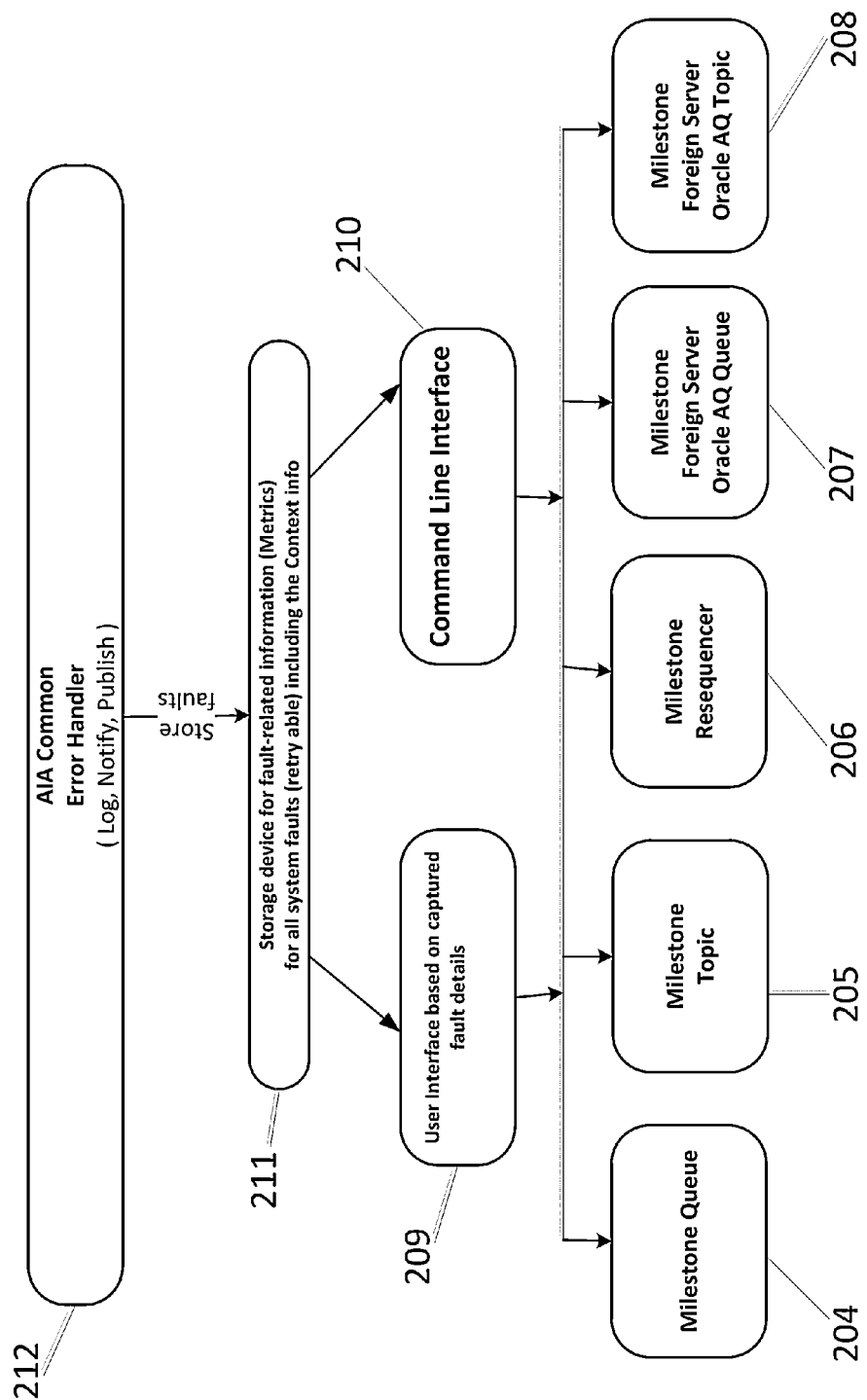
FIG. 2 is an overview block diagram of a system for resubmitting messages in accordance with one embodiment.

FIG. 2 is an overview block diagram of a system for resubmitting messages in accordance with one embodiment. A system such as an AIA common error handler 212 may log different faults that occur when sending messages between integration milestones, notify a user of such faults, and publish information relating to such faults. AIA common error handler 212 may log faults relating to messages sent between different types of integration milestones. AIA common error handler 212 may store information relating to the faults. The information may be stored within a storage device, such as storage device 211. The stored information relating to faults may include failed messages and may include business context information relating to the failed messages. As described above, these messages may be re-sent at a later time. In one embodiment, the messages may be re-sent via user interactions with a user interface 209. In another embodiment, the messages may be re-sent by commands entered via a command line interface 210. Once a message has been designated to be re-sent via user interface 209 or command line interface 210, the integration milestones 204-208, corresponding to the messages to be re-sent, are notified. In one embodiment, milestones 204-208 may operate in conjunction with an Oracle "Weblogic Server" ("WLS").

Figure 3:
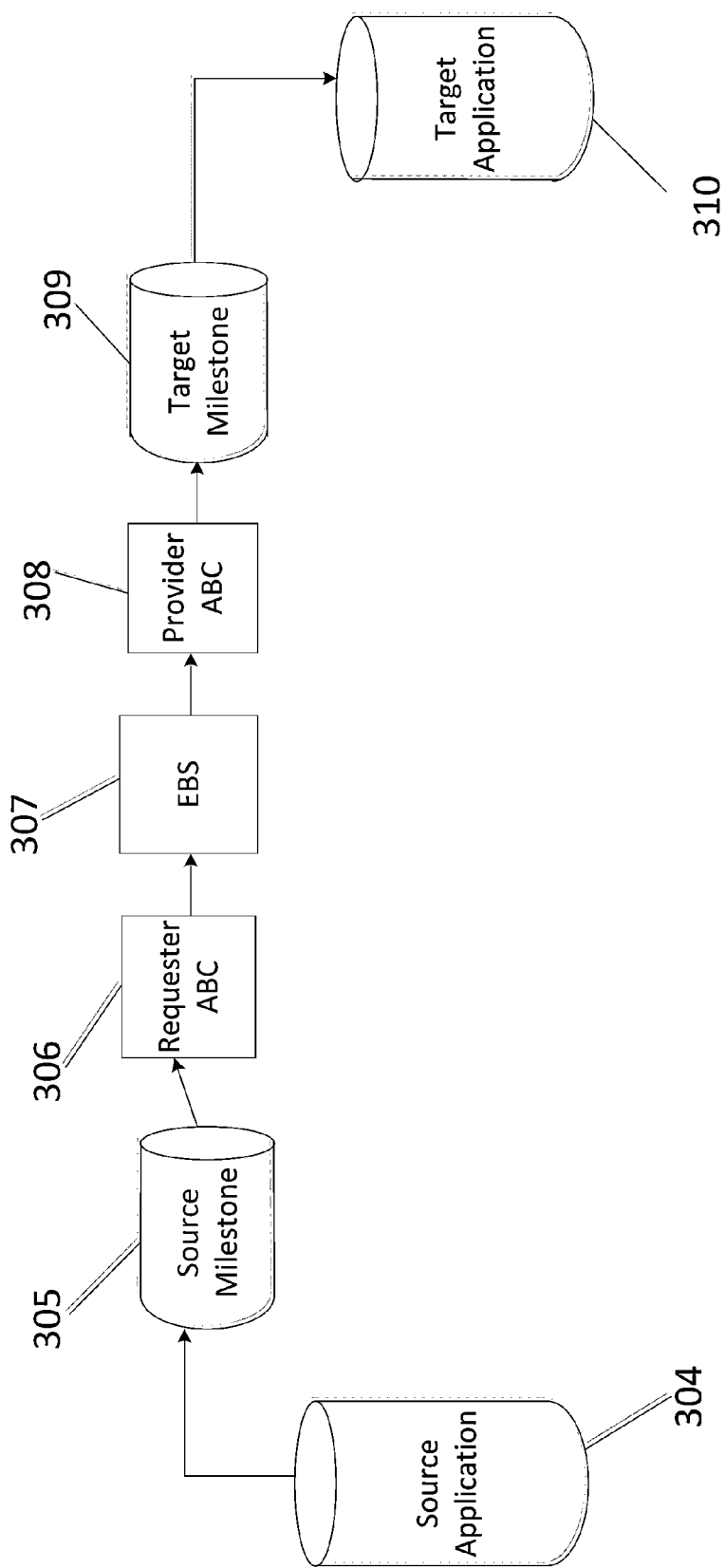
FIG. 3 illustrates integration between a source application and a target application in accordance with one embodiment.

FIG. 3 illustrates integration between a source application 304 and a target application 310 in accordance with one embodiment. As described above, source application 304 and target application 310 may each be associated with a source milestone 305 and a target milestone 309, respectively. An integration message may be transmitted from source milestone 305 to a requester application business connection ("Requester ABC") service 306. The integration message may then be transmitted from Requester ABC 306 to AIA artifacts such as an enterprise business service ("EBS") 307. An EBS may represent an application or a service definition for performing a business task. From EBS 307, the integration message may be transmitted to a provider application business connection ("Provider ABC") service 308. From Provider ABC 308, the integration message may be transmitted to target milestone 309 and target application 310. Target application 310 may then be properly integrated with source application 304.

Figure 4:
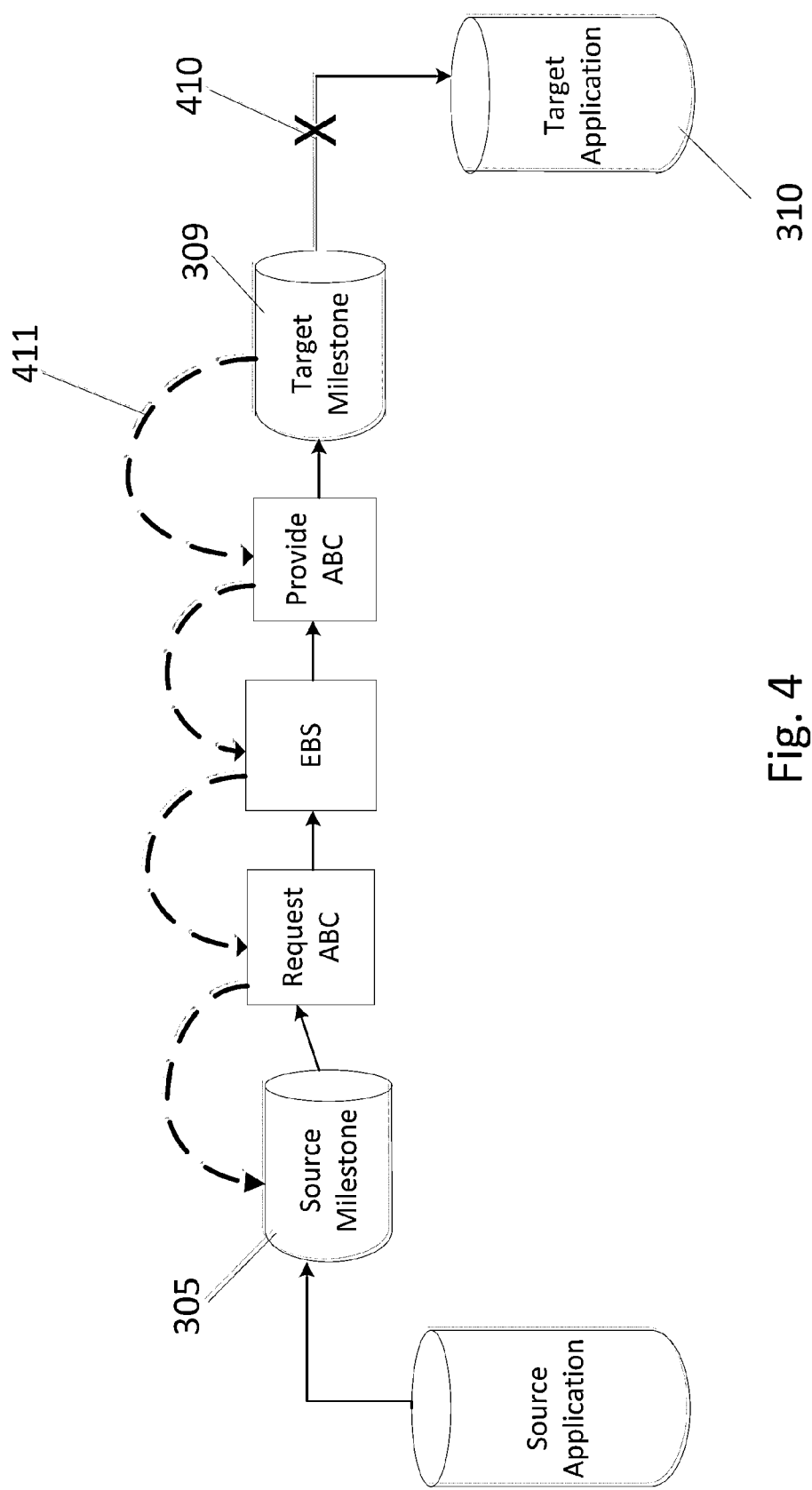
FIG. 4 illustrates rolling back a failed message in accordance with one embodiment.

FIG. 4 illustrates rolling back a failed message in accordance with one embodiment. If a fault occurs during the transmission of the message, then the message may be rolled back to the source milestone 305 from which the message originated. In one embodiment, when the message is rolled back to source milestone 305, the message may be stored in a separate repository (such as an "error bucket," for example). For example, if a transmission fault 410 occurs between target milestone 309 and target application 310, a roll-back process 411 will return the message back to source milestone 305. Although this example shows a transmission fault between a target milestone 309 and a target application 310, a fault may occur at any point between source milestone 305 and target milestone 309. In the event of such a fault, the message will also be rolled back to source milestone 305.

Figure 5:
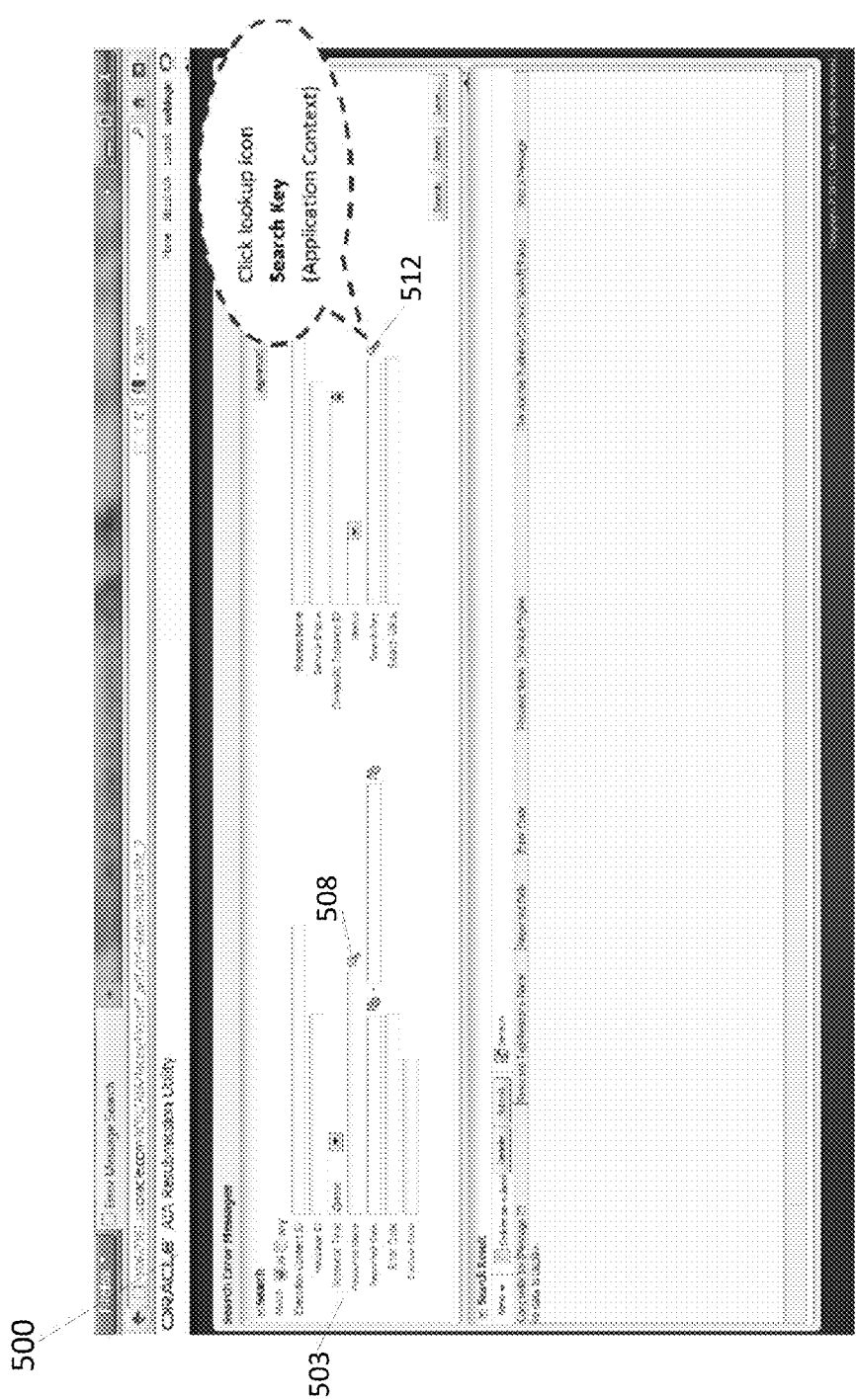
FIG. 5 is a screen shot of an interface that allows a user to search through/filter the different messages for resubmission according to specified criteria in accordance with one embodiment.

FIG. 5 is a screen shot of an interface 500 that allows a user to search through/filter the different messages for resubmission according to specified criteria 503 in accordance with one embodiment. FIG. 5, and the screen shots of FIGS. 6-11 below, can be generated by module 16 of FIG. 1. Further, the functionality described in FIGS. 5-11 can be provided by system 10. Interfaces 500-1100 may correspond to user interface 209 of FIG. 2.

In one embodiment, the filter for finding a specific message to be resubmitted may filter by criteria relating to context information associated with the messages that are to be sent between integration milestones. Context information may include, but is not limited to, context information specific to the particular AIA for the messages, including parameters such as "ServiceName," "ProcessName," "ErrorCode," "SystemCode," "Timestamp," and/or "Execution Context ID" ("ECID"), for example.

Context information for the messages may be application-specific or AIA-specific. Application-specific context information for messages includes context information that is specific to the applications which are used by the user. AIA-specific context information includes context information that is specific to the particular AIA framework. However, a user may possibly be only familiar with the application-specific context information (of the application used by the user) and may not be familiar with the context information that is specific to the particular AIA framework. Thus, a user may have difficulty filtering messages to be re-sent using context information specific to the particular AIA framework.

For example, suppose that a user creates a sales order using a first type of application such as a Customer Relationship Management ("CRM") application from Siebel/Oracle Corp. ("Siebel application") (i.e., an application used by the user and that is to be integrated). After the user creates the sales order using the Siebel application, the user may possibly be only familiar with the business context information that is specific to the Siebel application (e.g., an "ORDERID" context information generated by the Siebel application). However, once an integration message is sent between the Siebel application and another application (e.g., an application operating in conjunction with Oracle Fusion Middleware), new AIA-specific context information (e.g., "CompositeInstance" and execution context identification ("ECID")) is subsequently used to refer to the earlier application-specific business context information. As described above, the user, who may be only familiar with the application-specific business context information, may not recognize which AIA-specific context information corresponds to which application-specific business context information. In other words, the user may not recognize the correlation between the application-specific business context information and the AIA-specific context information.

In view of the above, embodiments may correlate business context information used by the applications (i.e., the applications which are used by the user and that are to be integrated) with the AIA-specific context information. In other words, embodiments may determine the proper correspondence between application-specific business context information and AIA-specific context information. As such, although a user may filter messages in accordance with application-specific business context information, embodiments are able to filter the messages to be re-sent in accordance with the appropriate AIA-specific context information that corresponds to the application-specific business context information.

As shown in FIG. 5, the filter criteria 503 may include criteria such as, but not limited to, "Execution Context ID," "Message ID," "Resource Type," "Resource Name," "Reported Date," "Error Code," "System Code," "Process Name," "Service Engine," "Composite Instance ID," "Status," "Search Key," and "Search Value."

In one embodiment, messages are grouped and presented in accordance to filtering by AIA-specific context information. Grouping and presenting messages in accordance to filtering by AIA-specific context information may be useful to a user because a message may require more than one resubmission. By grouping and presenting messages in accordance to AIA-specific context information, such as by "ECID," for example, a user may be presented with a transmission history of the message to be re-sent (e.g., how many times a failed message has been resubmitted). The user may delete such historical instances, as described in more detail below.

The information to be filtered may correspond to the information transmitted from AIA Common Error Handler 212 and stored in storage device 211 of FIG. 2. Upon clicking on icon 508, a listing of names of different integration milestones can be retrieved. Upon clicking on icon 512, a list of business context information that may be searchable may be retrieved.

Figure 6:
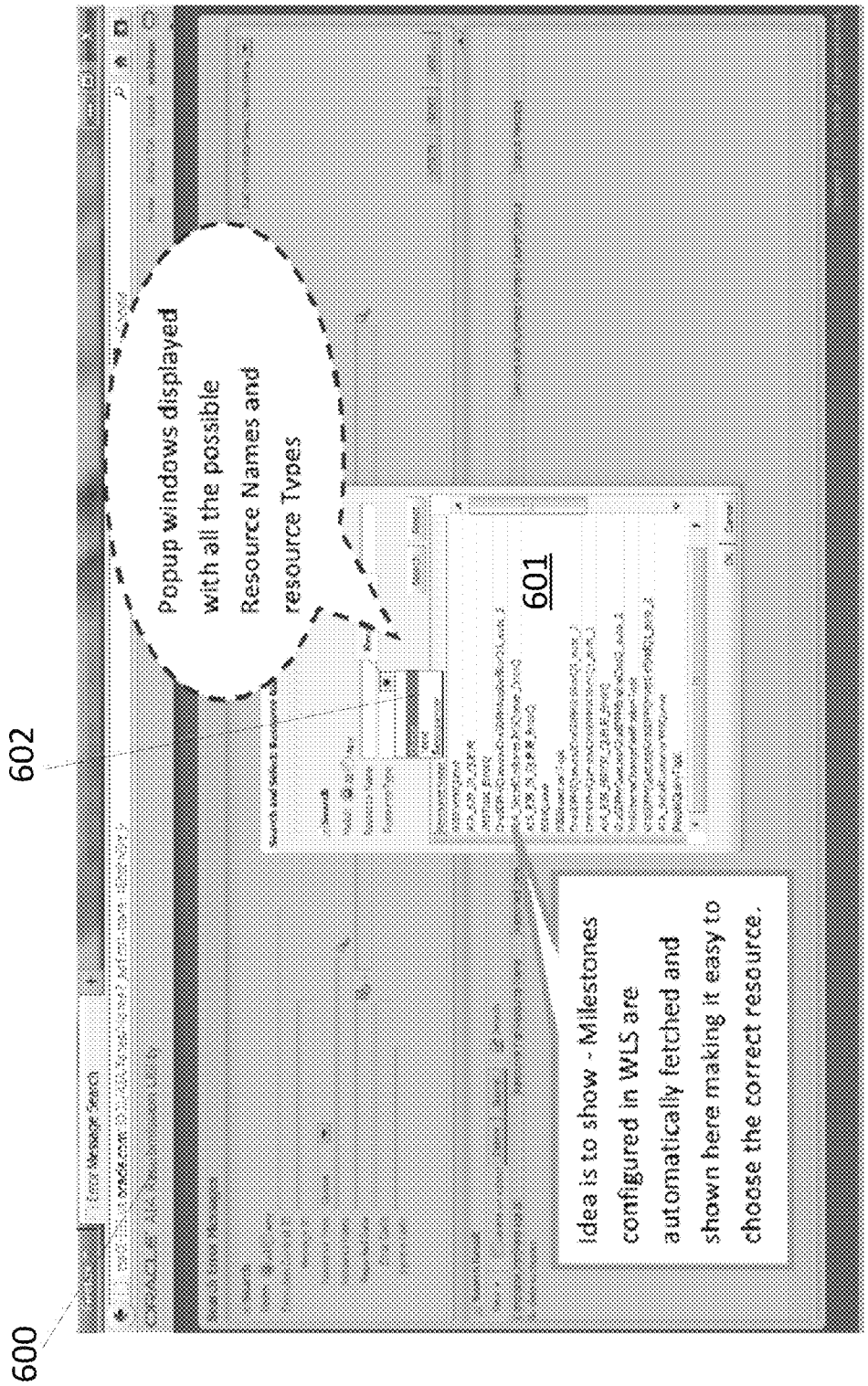
FIG. 6 is a screen shot of an interface that shows a list of different integration milestones that may be involved in the resubmission of a message in accordance with one embodiment.

FIG. 6 is a screen shot of an interface 600 that shows a list of different integration milestones 601 that may be involved in the resubmission of a message in accordance with one embodiment. As described above, list 601 may include different types of integration milestones such as, but not limited to, queues, topics, resequencers, and AQs. List 601 may display all possible resource/milestone names and all the possible resource/milestone types. In one embodiment, milestones configured in WLS are automatically displayed in list 601. As such, any particular milestone sought by the user may be easily selected from list 601. List 601 may be retrieved upon clicking icon 508 of FIG. 5. Using field 602, the integration milestones of list 601 may be filtered by "resource type" (i.e., the type of integration milestone).

Figure 7:
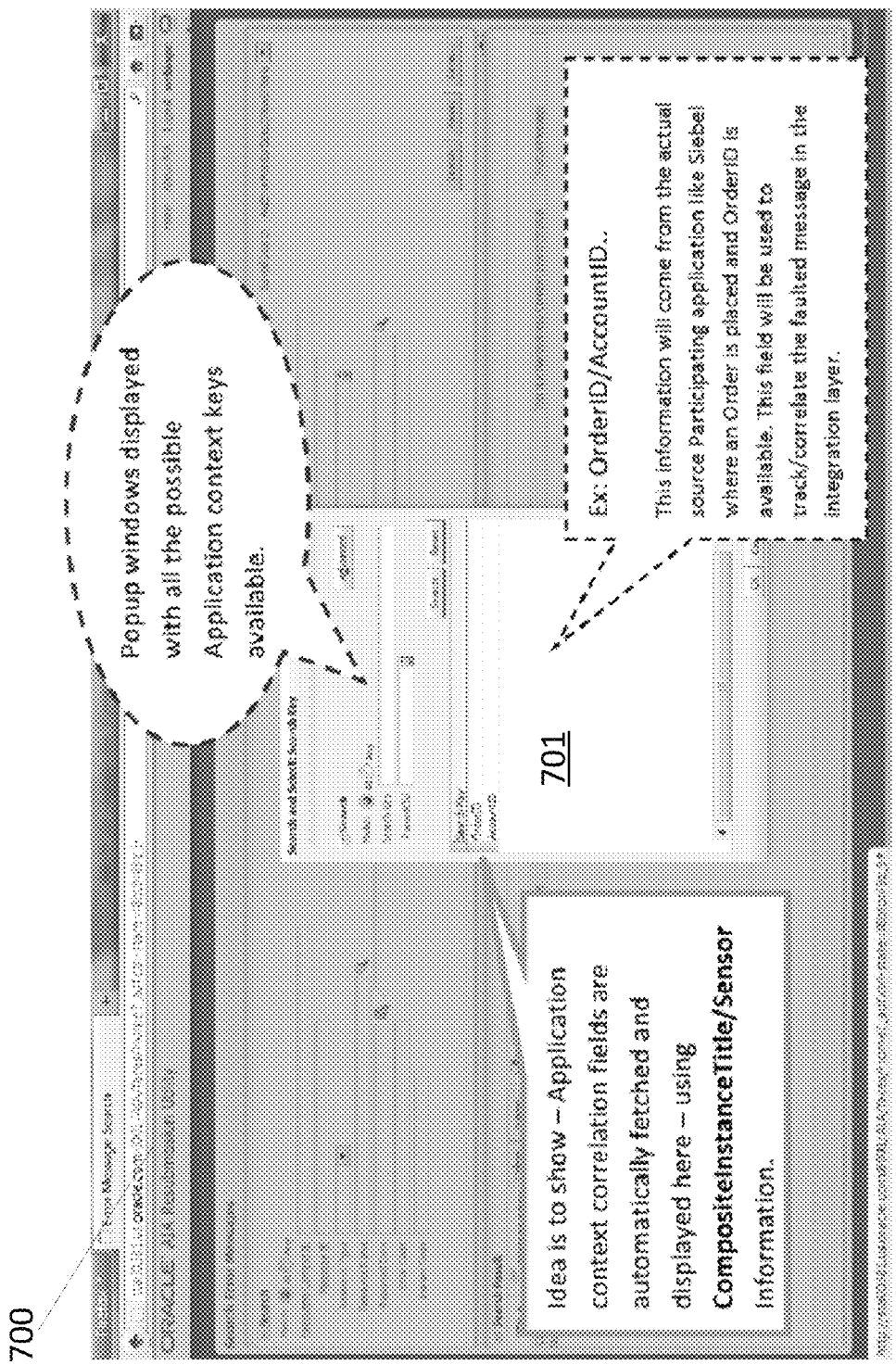
FIG. 7 is a screen shot of an interface that allows a user to search through/filter the different messages for resubmission according to business context information in accordance with one embodiment.

FIG. 7 is a screen shot of an interface 700 that allows a user to search through/filter the different messages for resubmission according to business context information in accordance with one embodiment. Interface 700 shows a list 701 of possible application-specific business context information used by applications (e.g., a Siebel application). In one embodiment, list 701 is displayed in a popup window and lists all possible application-specific business context information used by applications. For example, as previously described, when a user creates a sales order using a Siebel application, the user may possibly be only be familiar with the business context information that is specific to the Siebel application (e.g., "OrderID" and "AccountID" information). This business context information may be shown in list 701 upon clicking icon 512 of FIG. 5. As shown in FIG. 7, the business context information shown in list 701 may be retrieved from the application to be integrated (e.g., the Siebel application). In one embodiment, the business context information shown in list 701 is correlated to the AIA-specific context information. Correlation fields correlating the business context information and the AIA-specific context information may be automatically fetched using CompositeInstanceTitle/Sensor Information. CompositeInstanceTitle information can be populated with business context information to correlate with AIA-specific context information, and used for filtering/searching for failed messages. In addition, if a user wishes to search the messages based upon some other information, like a secondary identifier, the user can apply those secondary identifiers as sensors, and, once enabled, a failed message of interest can be searched for using sensor values. In one embodiment, a secondary identifier can be a mobile number. As such, the user may filter the messages to be re-sent in accordance with the appropriate AIA-specific context information that corresponds to the application-specific business context information shown in list 701. The fields of application-specific business context information will be used to track/correlate messages to be re-sent in the integration layer.

Figure 8:
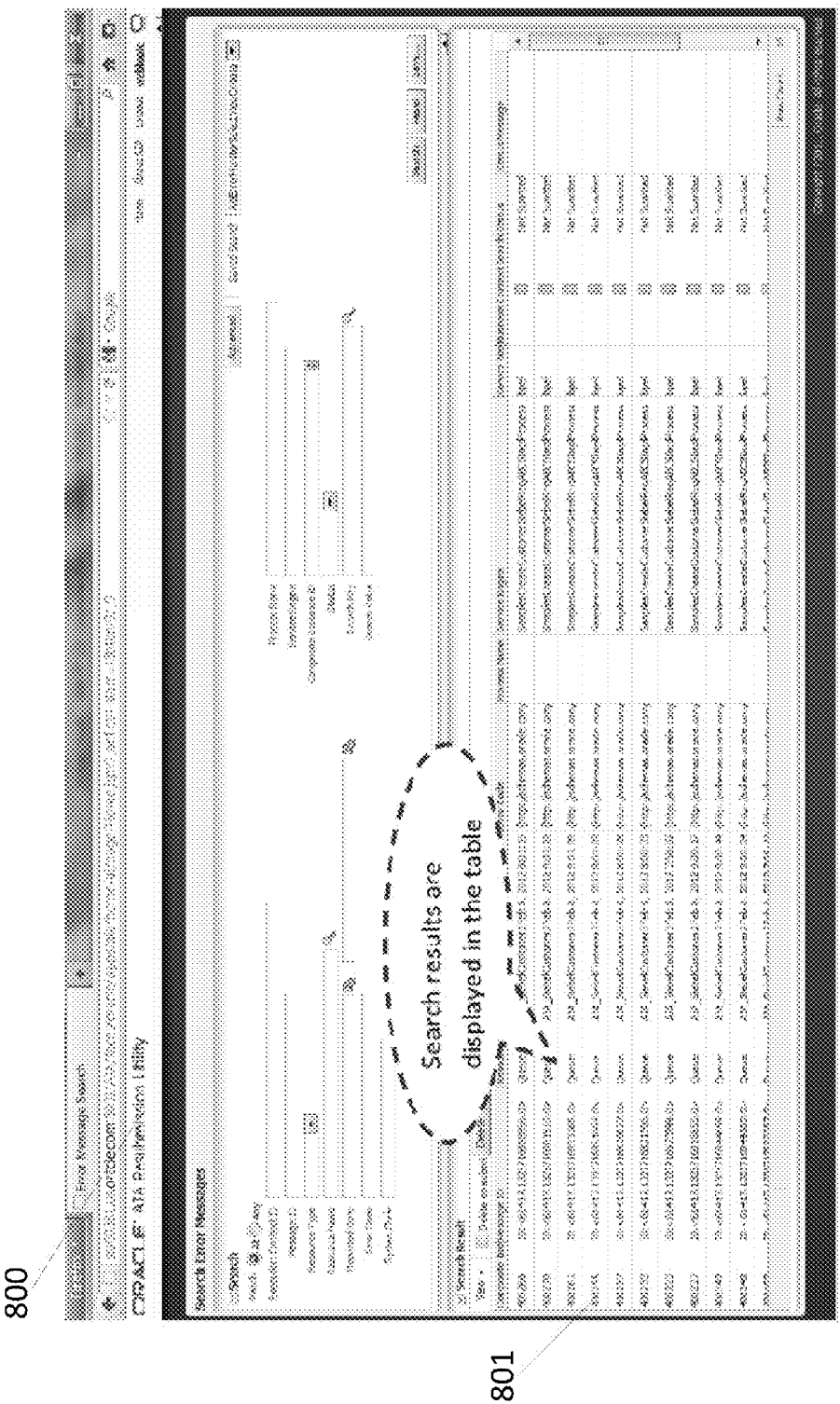
FIG. 8 is a screen shot of an interface that displays results after applying a filter to the different messages for resubmission in accordance with one embodiment.

FIG. 8 is a screen shot of an interface 800 that displays results 801 after applying a filter to the different messages for resubmission in accordance with one embodiment. In the specific example shown in FIG. 8, the applied filter has not yet specified any parameters for filtering (as shown by the empty criteria fields). Search results 801 show different messages for resubmission. Each line of search results 801 may correspond to a single message for resubmission.

Figure 9:
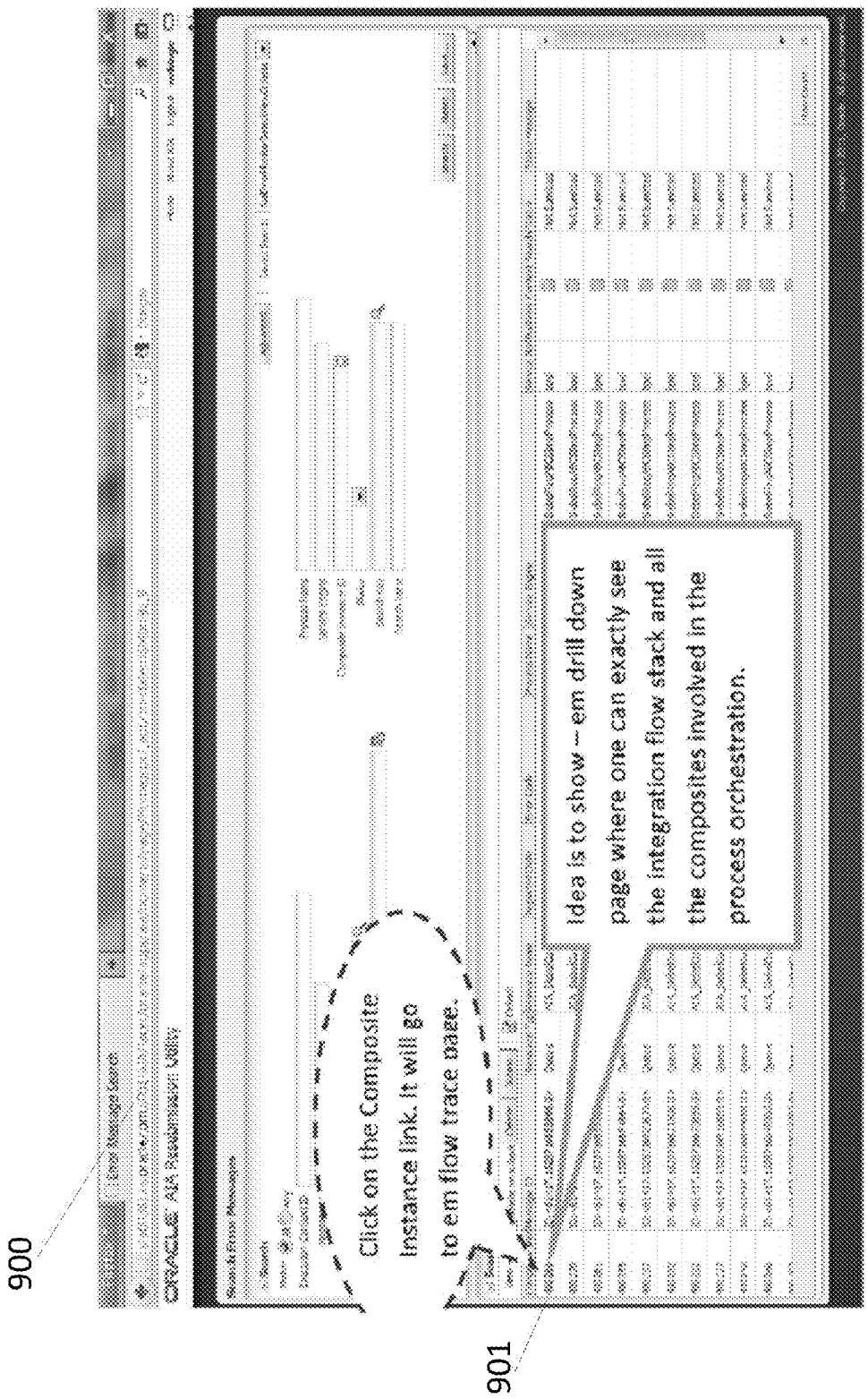
FIG. 9 is a screen shot of an interface that allows a user to select messages for resubmission and to view the flow traces of the selected messages in accordance with one embodiment.

FIG. 9 is a screen shot of an interface 900 that allows a user to select messages for resubmission to view the flow traces of the selected messages in accordance with one embodiment. The flow trace of a message may show the process by which the message is transmitted. In one embodiment, by clicking on a composite instance link of a message, the flow trace of the message may be displayed. A flow trace may show the process by which the message is transmitted through an enterprise management ("EM") system. As such, embodiments allow a user to "drill down" to see the components involved in the transmission of a message in an integration flow. In one embodiment, the user can drill down to see all the components involved in the transmission of the message in the integration flow. The user may see the integration flow stack and all the composites involved in the process orchestration. An integration flow stack can generally be considered to be a series of composite calls that are part of a functional flow. Composites can be technical artifacts of Oracle "Fusion Middleware Service Oriented Architecture" provided by Oracle Corp., for example. Interface 900 shows different messages for resubmission, and each message may be individually selected. For example, a user may select the message with "Composite Instance 400266" 901 to view the flow trace of this message.

Figure 10:
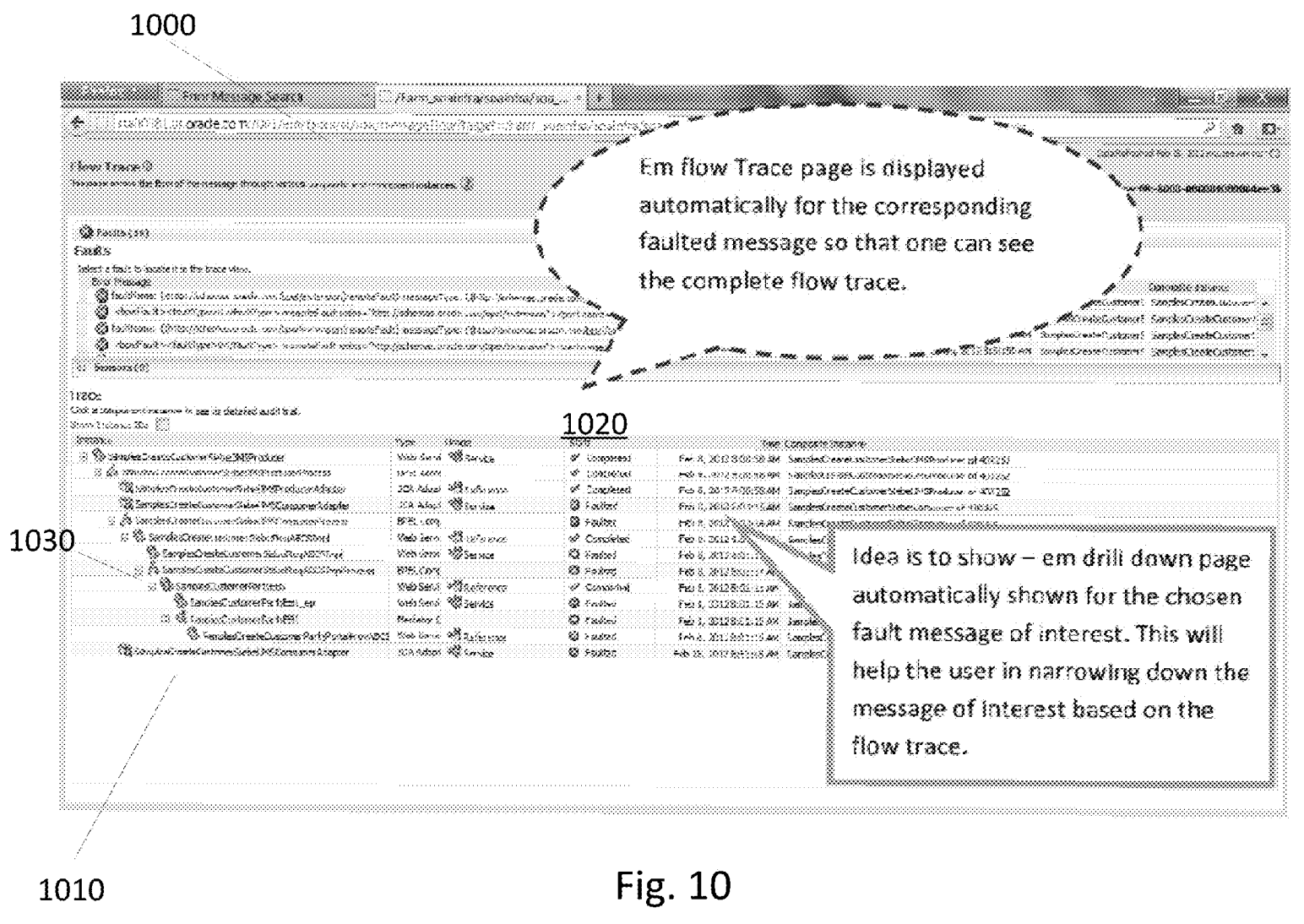

FIG. 10 is a screen shot of an interface that shows a flow trace of a selected message 901 in accordance with one embodiment. Upon selecting message 901 via interface 900 of FIG. 9, interface 1000 shows a flow trace 1010. Flow trace 1010 is the flow trace for selected message 901. Flow trace 1010 shows the various components/milestones 1030 that the message passes though. In one embodiment, flow trace 1010 is displayed automatically for selected message 901 so that a user can see the complete flow trace of selected message 901. By displaying a page with flow trace 1010 automatically, a user may find a particular message of interest based on the displayed flow trace. Interface 1000 also may include a "state" designation 1020 that indicates whether the message successfully passed through each of components/milestones 1030.

Figure 11:
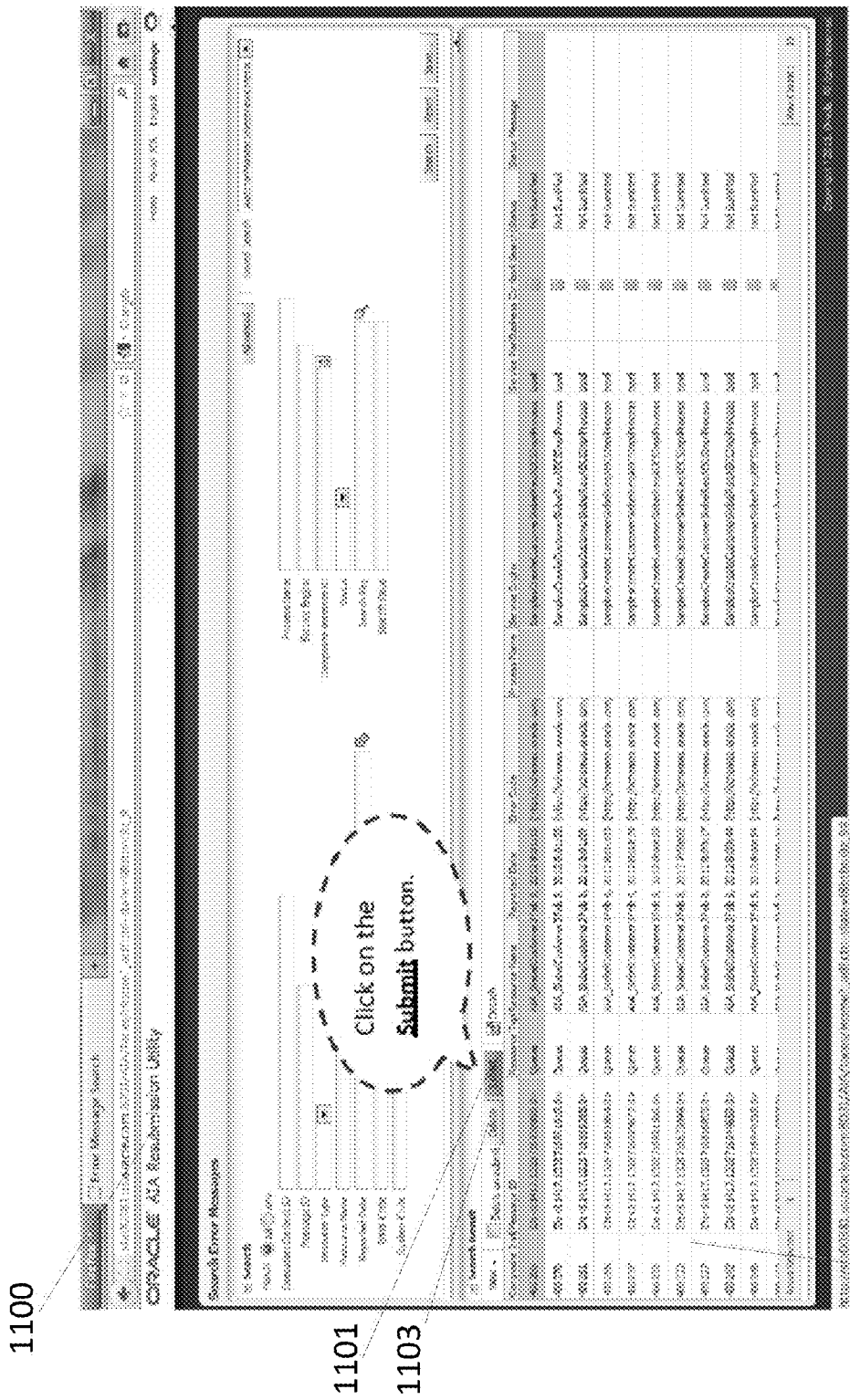
FIG. 11 is a screen shot of an interface that allows a user to resubmit a message in accordance with one embodiment.

FIG. 11 is a screen shot of an interface 1100 that allows a user to resubmit a message in accordance with one embodiment. Interface 1100 includes a submit button 1101 that allows a user to resubmit listed messages 1102. Interface 1100 also includes a delete button 1103 that allows a user to delete messages.

In one embodiment, a message to be re-sent may continually fail to be sent. In one embodiment, a "delete function" (initiated via delete button 1103) allows a user to delete a message to be re-sent from a particular integration milestone. Allowing a user to delete the failed message from a particular integration milestone may be useful because certain messages will not be successfully resubmitted regardless of the number of attempts for resubmission. For example, suppose a message is sent that executes the processing of credit card information. Further, suppose that the credit card information to be processed is invalid. In this example, once the message initially fails to be fully sent/executed (due to the invalid credit card information), the message will continue to fail to be fully sent/executed, regardless of the number of times the message is re-sent, because the credit card information will inevitably be invalid. As such, because such a message is bound to fail until new/corrected credit card information is presented, a user may wish to remove the failed message from the system/milestone so that the failed message is not continually resubmitted and failed to be sent.

In one embodiment, if a specific message is designated to be resubmitted, the relevant milestones involved in the flow trace/integration flow of the specific message (i.e., the process of transmitting the specific message) are determined based off of an AIA canonical fault structure of the specific message. In one embodiment, the flow trace/integration flow of the specific message is defined by transactional boundaries, and references a source integration milestone and a target integration milestone. Embodiments resubmit the specific message by connecting to and communicating with the relevant milestones.

Figure 12:
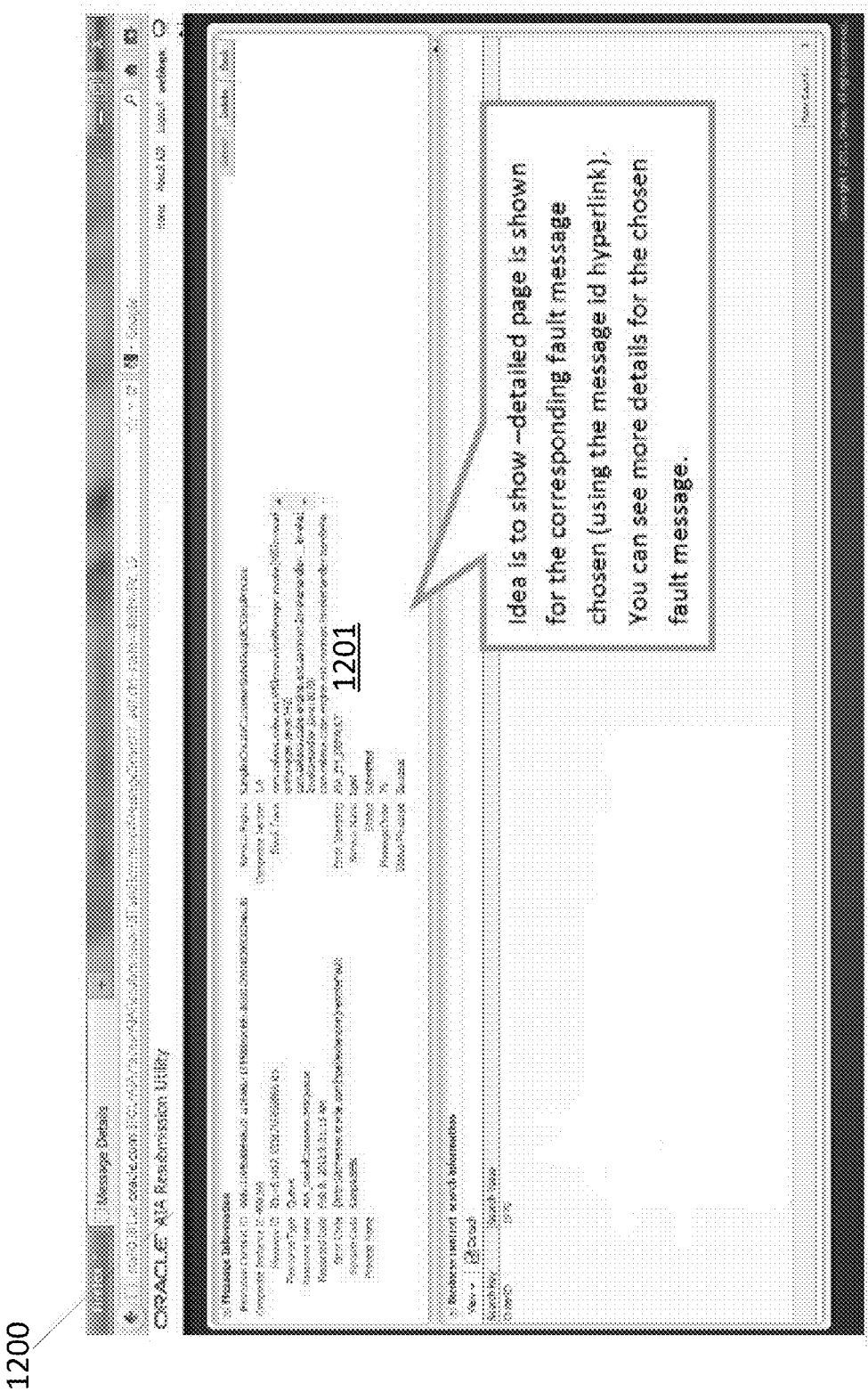
FIG. 12 is a screen shot of an interface that allows a user to view details relating to the status of a message in accordance with one embodiment.

FIG. 12 is a screen shot of an interface 1200 that allows a user to view details relating to the status of a message in accordance with one embodiment. In one embodiment, by selecting a message (e.g., message 901 of FIG. 9), the user can determine whether the message has been successfully sent or whether the message has failed to be sent due to an error/fault. Interface 1200 can display additional details 1201 pertaining to message 901. For example, additional details 1201 can include status information. Referring to additional details 1201, in this example, the status "success" indicates that the message has been successfully sent. However, additional details 1201 can also indicate to the user that the message has not been successfully sent, and can also provide users with more details relating to any error/fault that has occurred. In one embodiment, the details of an error/fault are all presented to a user, which allows the user to determine whether the message should be resubmitted or not.

Figure 13:
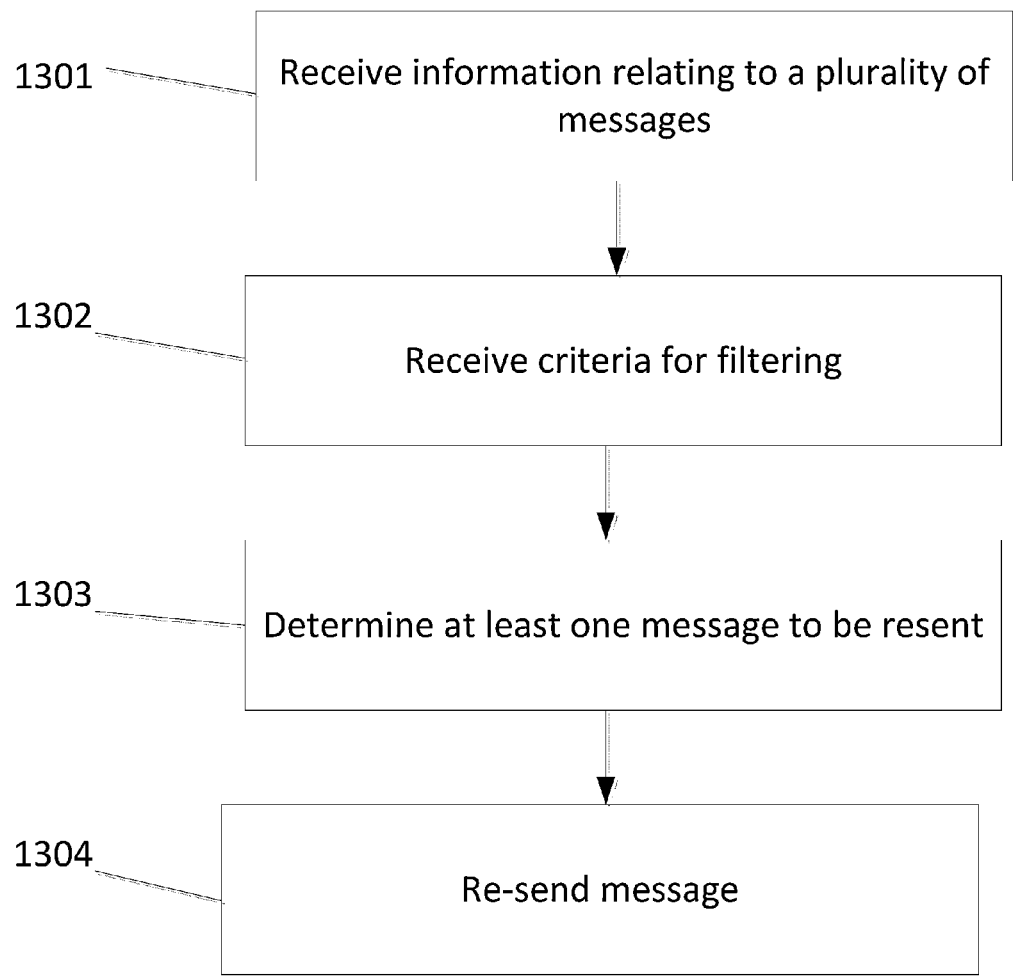
FIG. 13 is a flow diagram of the functionality of the message resubmission module of FIG. 1 in accordance with one embodiment.

FIG. 13 is a flow diagram of the functionality of the message resubmission module 16 of FIG. 1 in accordance with one embodiment. In one embodiment, the functionality of the flow diagram of FIG. 13 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1301, one embodiment receives information relating to a plurality of messages that have been unsuccessfully transmitted. The transmissions may have resulted in faults. Each of the messages may have failed to be transmitted between integration milestones. Examples of integration milestones include queues, topics, resequencers, and AQs, for example. The failed messages may have been transmitted between a variety of different types of integration milestones, and are not limited to a specific type of integration milestone. As previously described, the information relating to the messages/faults may be received from storage device 211 of FIG. 2. As previously described, the information may be presented using a consolidated view of the failed messages and of the different integration milestones via various interfaces (e.g., interfaces 500, 600, 700, 800, 900, 1000, 1100, and 1200 of FIGS. 5-12, respectively) accessed by computer system 10 of FIG. 1.

At 1302, one embodiment receives criteria by which to filter the received information. As previously described, the received information may be filtered according to criteria relating to business context information associated with messages to be resubmitted. The criteria may be received from a user via various interfaces. The user may enter criteria that relate to application-specific business context information which is correlated to AIA-specific context information, which is then used as the search criteria.

At 1303, one embodiment applies the filter to the received information. The received information may include a listing of messages that are to be re-sent. After applying the filter, at least one message for resubmission is determined. The at least one message for resubmission may be displayed as a list 801 as shown in FIG. 8.

At 1304, the determined message is re-sent. One embodiment may determine the relevant milestones involved in the process of transmitting the message to be re-sent based off of the AIA canonical fault structure of the message to be re-sent. The message to be re-sent may then be resubmitted by communicating with at least one of the relevant integration milestones associated with the message.

As described above, embodiments of the present invention are directed to a tool configured to resubmit messages between different types of integration milestones by providing an overall, consolidated view of the messages to be re-sent/resubmitted and of the different integration milestones corresponding to these messages. The tool is configured to provide filters that filter the messages to be re-sent/resubmitted in accordance with various criteria so that a user can find a specific message or specific messages to resubmit.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to resubmit a message for integration of applications, the resubmitting comprising:
   receiving context information associated with a plurality of messages configured to be communicated between different types of integration milestones, wherein each of the different types of integration milestones corresponds to a message checkpoint associated with an application, wherein at least two of the different types of integration milestones implement different logics for resubmission of failed messages, wherein each of the plurality of messages has failed to be transmitted between the different types of integration milestones, and the plurality of messages includes the message;
   receiving filtering criteria related to the received context information;
   selecting the message for resubmission by filtering the received context information based on the received filtering criteria; and
   sending the message from a first integration milestone to a second integration milestone.

2. The computer readable medium of claim 1, wherein the message for resubmission allows a source application and a target application to function as a coordinated whole.

3. The computer readable medium of claim 1, wherein the different types of integration milestones comprise resequencers.

4. The computer readable medium of claim 1, wherein the different types of integration milestones comprise advanced queues.

5. The computer readable medium of claim 1, wherein the received filtering criteria comprises business context information.

6. The computer readable medium of claim 1, further comprising displaying a flow trace of the message for resubmission.

7. The computer readable medium of claim 1, wherein sending the message comprises communicating with at least one of the first integration milestone or the second integration milestone.

8. A method for resubmitting a message for integration of applications, comprising:
   receiving context information associated with a plurality of messages configured to be communicated between different types of integration milestones, wherein each of the different types of integration milestones corresponds to a message checkpoint associated with an application, wherein at least two of the different types of integration milestones implement different logics for resubmission of failed messages, wherein each of the plurality of messages has failed to be transmitted between the different types of integration milestones, and the plurality of messages includes the message;

receiving filtering criteria related to the received context information;

selecting the message for resubmission by filtering the received context information based on the received filtering criteria; and sending the message from a first integration milestone to a second integration milestone.

9. The method of claim 8, wherein the message for resubmission allows a source application and a target application to function as a coordinated whole.

10. The method of claim 8, wherein the different types of integration milestones comprise resequencers.

11. The method of claim 8, wherein the different types of integration milestones comprise advanced queues.

12. The method of claim 8, wherein the received filtering criteria comprises business context information.

13. The method of claim 8, further comprising displaying a flow trace of the message for resubmission.

14. The method of claim 8, wherein sending the message comprises communicating with at least one of the first integration milestone or the second integration milestone.

15. A system for resubmitting a message for integration of applications, comprising:

a processor;

a memory coupled to the processor;

a first receiving module that receives context information associated with a plurality of messages configured to be communicated between different types of integration milestones, wherein each of the different types of integration milestones corresponds to a message checkpoint associated with an application, wherein at least two of the different types of integration milestones implement different logics for resubmission of failed messages, wherein each of the plurality of messages has failed to be transmitted between the different types of integration milestones, and the plurality of messages includes the message;

a second receiving module that receives filtering criteria related to the received context information;

a selecting module that selects the message for resubmission by filtering the received context information based on the received filtering criteria; and a sending module that sends the message from a first integration milestone to a second integration milestone.

16. The system of claim 15, wherein the message for resubmission allows a source application and a target application to function as a coordinated whole.

17. The system of claim 15, wherein the different types of integration milestones comprise resequencers.

18. The system of claim 15, wherein the received filtering criteria comprises business context information.

19. The system of claim 15, further comprising a displaying module that displays a flow trace of the message for resubmission.

20. The system of claim 15, wherein sending the message comprises communicating with at least one of the first integration milestone or the second integration milestone.

\* \* \* \* \*

UNITED STATES PATENT AND TRADEMARK OFFICE
CERTIFICATE OF CORRECTION

PATENT NO.        : 9,141,340 B2
APPLICATION NO.   : 13/906730
DATED             : September 22, 2015
INVENTOR(S)       : Panangipalli et al.

Page 1 of 1

It is certified that error appears in the above-identified patent and that said Letters Patent is hereby corrected as shown below:

On the Title page, column 1, under applicant, line 2, delete "Redwoodshores," and insert -- Redwood Shores, --, therefor.

Signed and Sealed this
Twenty-third Day of August, 2016

Michelle K. Lee
*Director of the United States Patent and Trademark Office*